United States Patent [19]

Bourqui et al.

[11] Patent Number: 5,289,108

[45] Date of Patent: Feb. 22, 1994

[54] STABLE DIRECT VOLTAGE GENERATOR

[75] Inventors: Bernhard Bourqui, Courtepin; Pierre Gauthier, Mur, both of Switzerland

[73] Assignee: Saia AG Industrie-Electronik und Komponenten, Murten, Switzerland

[21] Appl. No.: 666,850

[22] Filed: Mar. 8, 1991

[30] Foreign Application Priority Data

Mar. 27, 1990 [EP] European Pat. Off. ........ 90810245.2

[51] Int. Cl.[5] ............................................. G05F 1/613
[52] U.S. Cl. ..................................... 323/222; 323/284
[58] Field of Search ...................... 323/222, 282, 284

[56] References Cited

U.S. PATENT DOCUMENTS

| | | | |
|---|---|---|---|
| 4,242,629 | 12/1980 | Shuey | 323/222 |
| 4,315,209 | 2/1982 | Schmoock | 323/231 |
| 4,390,829 | 6/1983 | Jarrett | 323/231 |
| 4,516,067 | 5/1985 | Hoffman | 323/282 |
| 4,531,084 | 7/1985 | Hoffman | 323/278 |
| 4,584,517 | 4/1986 | Schwob | 323/222 |
| 4,683,529 | 7/1987 | Bucher | 323/222 |
| 4,752,866 | 6/1988 | Huynh et al. | 363/138 |
| 4,791,350 | 12/1988 | Roof | 323/284 |
| 4,837,495 | 6/1989 | Zansky | 323/285 |
| 4,930,040 | 5/1990 | Binarsch et al. | 323/287 |
| 5,001,620 | 3/1991 | Smith | 323/285 |
| 5,003,454 | 3/1991 | Bruning | 323/222 |
| 5,006,975 | 4/1991 | Neufeld | 323/222 |

FOREIGN PATENT DOCUMENTS 2117143 10/1983 United Kingdom .......... H02H 9/02

Primary Examiner—Jeffrey L. Sterrett
Attorney, Agent, or Firm—Richard Linn

[57] ABSTRACT

Current pulses are conducted through an inductance by means of a switching transistor. The switching transistor is controlled by means of an amplifier and pulse shaper circuit in such a manner that a constant average direct current flows in a closed loop comprising said inductance and a recovery diode, resulting in a regulated, constant output voltage across two Zener diodes. This allows a particularly effective operation with relatively low power losses in said switching transistor as compared to the utility current at the output terminals, and the circuit operates reliably in a wide range of operating voltages.

21 Claims, 1 Drawing Sheet

STABLE DIRECT VOLTAGE GENERATOR

FIELD OF THE INVENTION

The present invention refers to a method for the generation of a stable direct voltage, and to a direct voltage source comprising an inductance which is connected in series with a controllable switching element.

DISCUSSION OF BACKGROUND

Stable direct voltages are needed for the operation of various circuits and apparatus. The stabilization of the output voltage is in most cases effected electronically by a so-called longitudinal or a transversal regulation, or by a combination of the two methods; in all cases, however, the regulation is associated with considerable power losses.

It is also known from EP-A-0 129 181 that an inductance and a switching transistor in series and that the switching transistor may be controlled in such a manner that the peak voltages, which are produced in the inductance whenever the switching transistor is cut off and which are discharged by a diode, result in a constant direct voltage at the output. In this case however, the useful energy/input energy ratio is relatively unfavorable.

SUMMARY OF THE INVENTION

It is an object of the present invention to provide a method and a circuit featuring a low power dissipation, a correspondingly small volume with respect to the available power, very short transient phenomena during switch-on and switch-off, i.e. a correspondingly short restoration time an economical price as and a very large range of supply voltages. These objects are attained by means of a method wherein a direct current is generated in an inductance and regulated by means of a current discriminator so as to be constant on the average, said direct current generating said stable direct voltage across a resistor, and by a direct voltage source wherein the current in sand inductance is regulated at a constant average value by means of a current discriminator and said controllable switching element, and wherein said current flows through a resistor, resulting in a stabilized voltage drop across said resistor. The mentioned advantages are obtained by this arrangement, as will be explained hereinafter. The direct current is preferably switched on and off by means of a switch means, more particularly a switching transistor, and conducted in a loop through said inductance, a recovery diode and said resistor. Most favorable conditions for a DC-DC conversion are thus provided as it is sufficient for the current in the switch to be only a fraction of the direct current in the inductance, the recovery diode and the resistor.

Said resistor may preferably be conformed as a Zener diode or a series arrangement of several Zener diodes, which provides an additional stabilization of the output voltage under particularly favorable conditions.

BRIEF DESCRIPTION OF THE DRAWINGS

The invention will now be explained in more detail with reference to a presently preferred embodiment.

DESCRIPTION OF PREFERRED EMBODIMENT

Figure 1:
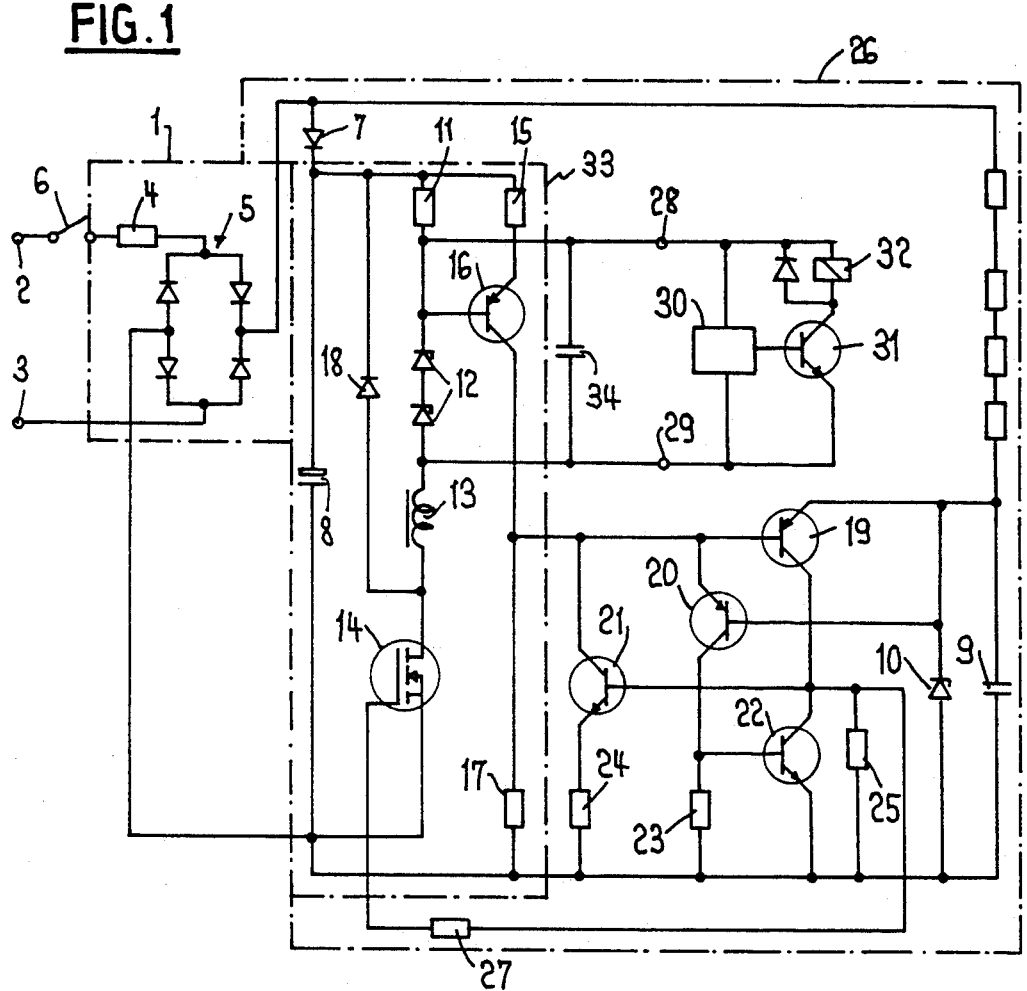
FIG. 1 shows the diagram of the direct voltage source of the invention.

The voltage source depicted in FIG. 1 comprises an input section or mains section 1 having connecting terminals 2 and 3, a protecting resistor 4 and a full-wave rectifier bridge 5. The input section, and particularly bridge 5, is designed for mains AC voltage. It is therefore possible to connect the voltage source directly to an appropriate energy source, e.g. to mains voltage or a DC battery. Input section 1 is provided with a mains switch 6 which allows the voltage source to be switched on and off.

The output of rectifier 5 is connected via diode 7 to filtering capacitor 8. Further, the output of the rectifier is directly connected to a filtering capacitor 9 by pre-resistors not referenced in the drawing. This capacitor 9, together with a Zener diode 10, serves as the supply of a control circuit which will be described below.

Connected to capacitor 8 is a series circuit consisting of a resistor 11, Zener diodes 12, an inductance 13 and a switching transistor 14. Another branch including a resistor 15, a transistor 16 and a resistor 17 is arranged in parallel thereto. The resistor 11, the Zener diodes 12 and the inductance 13 are shunted by a recovery diode 18. The circuit section which is formed of the elements 11 to 18 may be considered as an energy storing module 33 although it fulfills other functions as well, as will be explained herebelow. This applies especially for elements 11, 15, and 16, which serve as a current discriminator for current detection in the inductance 13 and for the corresponding control of switching transistor 14. The current in transistor 16 causes a voltage drop in resistor 17 which controls transistors 19 and 20. The collector of transistor 19 is connected to the base of a transistor 21 and to the collector of a transistor 22. Transistors 20 and, 21 are connected in series with resistors 23 and 24 respectively and transistor 22 is connected in parallel with a resistor 25. The circuit consisting of elements 19 to 25 acts as a pulse shaper and amplifier 26 which controls the switching transistor 14 via a resistor 27.

The output of the direct voltage source at terminals 28 and 29 is connected in parallel with the two Zener diodes 12, which means that parallel currents flow in the Zener diodes 12 and in the load. In other words, the Zener diodes 12 draw the current that is not taken by the load and simultaneously act as voltage stabilizers. A capacitor 34 is connected in parallel with the output.

FIG. 1 illustrates an example of a load connected to output terminals 28 and 29, namely an electronic timer 30 whose output controls a transistor 31 which is connected in series with the coil 32 of a relay.

Figure 2:
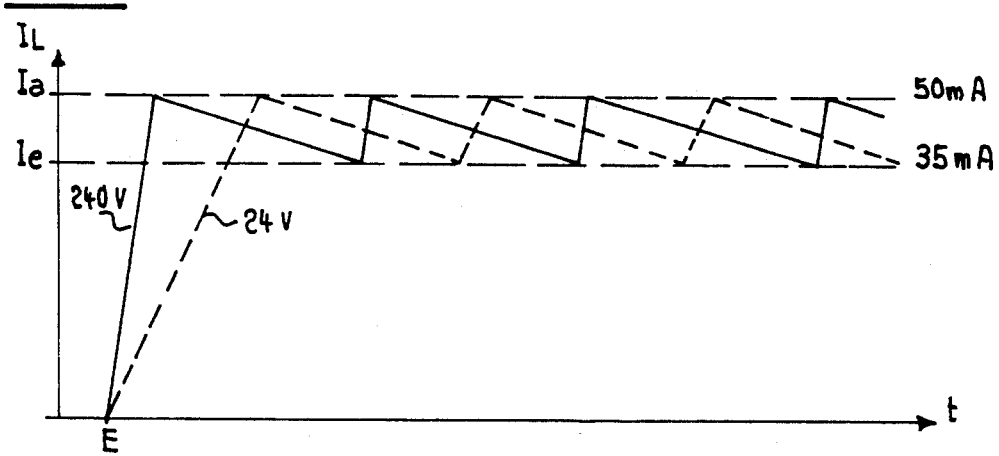
FIG. 2 shows a graph of current flow in the inductance.

Operation of the illustrated circuit is as follows:

When the input section 1 is switched on or connected, respectively, the capacitor 8 is charged via resistor 4, bridge 5 and diode 7 to a direct operating voltage the value of which may vary greatly according to the source of energy. This may be a battery voltage of e.g. 24V or a substantially higher voltage of about 240V if the circuit is connected to mains. In every case, however, bridge 5 provides rectification or correct polarity of the operating voltage. Capacitor 9 is simultaneously charged to a voltage which is determined by Zener diode 10. In the initial state, transistor 16 is non-conductive because in the voltage-free condition, the same potential is applied to the base and the emitter; transistor 19 is conductive, and switching transistor 14 is conductive as well. Consequently, a very steep rising current begins to flow through resistor 11, Zener diodes 12, inductance 13, and switching transistor 14, which is indicated in FIG. 2. As the current increases, the voltage at the base of transistor 16 decreases, so that a voltage rise approximately corresponding to the current rise results across resistor 17, respectively at the base of transistor 19 and the emitter of transistor 20, until transistors 20 and 22 are turned on and transistors 19 and 21 are turned off, switching transistor 14 being turned off via resistor 27 by a very quick tilting of the circuit. This process is illustrated in FIG. 2. As the cutoff current reaches Ia and switching transistor 14 is blocked, a slowly decreasing current keeps flowing in the same direction through inductance 13, diode 18, resistor 11 and Zener diodes 12. This process is illustrated in FIG. 2 by a relatively slow current drop down to a lower closing value Ie where the circuit 19 to 25 tilts back and transistor 14 becomes conductive again. To some extent, the transistor arrangement 19, 20 acts as a Schmitt trigger, and transistor 21 works in the inphase mode in order to meet the dynamic pulse shape and pulse amplitude requirements. As shown in FIG. 2, switching transistor 14 is periodically switched on and off, resulting in a very steep current rise in inductance 13 whenever the transistor is conductive and in a slow current drop when transistor 14 is blocked. FIG. 2 further illustrates that the current rise is steeper in the case of a high operating voltage of e.g. 240V than in the case of a 24V battery voltage. Consequently, under otherwise identical conditions, a high operating voltage also results in a higher switching frequency than a low operating voltage. Yet, the frequency difference does not correspond to the voltage difference as the respective current rise time is substantially shorter than the drop time in every case. At an operating voltage of 240V, for example, the current rise time is 1 us while the current drop has a duration of 30 us. The switching frequency under these conditions is in the range of 25 to 30 kHz.

In the present example, the cutoff current Ia may be 50 mA and the closing current Ie may be 35 mA. The power range of the circuit and thus the possible values for the switching frequencies and the closing and cutoff currents may vary largely.

The current flowing in the closed circuit formed by elements 11, 12, 13, and 18 can be a multiple of the average current through switching transistor 14, as already mentioned. Therefore it is of secondary importance even with respect to the efficiency of the circuit that a considerable current may be flowing in parallel with the load through Zener diodes 12 under certain circumstances. In the case of a constant load, however, the layout may be such that the current loss in Zener diodes 12 is relatively low. In the case of a variable load, Zener diodes 12 actually absorb the excess current, but the circuit still works very effectively for the mentioned reasons.

In the example of a load which is assumed in FIG. 1, actuation of switch 6 starts the power supply of a timer 30 which begins to count a certain time interval. As the time interval ends, transistor 31 is closed and relay 32 is energized so as to control a certain switching operation.

As mentioned above, the represented circuit is distinguished by a very fast connecting and disconnecting response, on the condition that all essential circuits, including in particular the pulse shaper and amplifier 26, are dead shortly after disconnecting. Diode 7, for example, serves for this purpose by preventing any supply of circuit 26 from capacitor 8 after disconnection of switch 6. Capacitor 9 is quickly discharged via transistor 19 and resistance 25.

An essential condition is that inductance 13 is always operated in a substantially linear area of its characteristic and by no means in its saturation range. This is an essential condition for a secure operation in a wide range of operating voltages.

What we claim is:

1. A method for generating a stable direct voltage for use with a load comprising the steps of:
    generating a direct current in an inductance;
    passing said direct current through a zener diode arrangement in series with a resistance;
    detecting, with a current discriminator, a magnitude of said direct current passing through said inductance and generating a detected current signal;
    shaping said detected current signal to produce a switching control signal; and
    switching said direct current back through a recovery diode in accordance with said switching control signal;
    wherein said direct current is switched through said recovery diode when said magnitude of said direct current is greater than a predetermined value so that said stable voltage is produced across said zener diode arrangement which is independent of a voltage across said resistance.

2. The method of claim 1, wherein said direct current is switched on and off by a switching means and is conducted through said inductance, said recovery diode, and said resistance in a circuit loop.

3. The method of claim 1, wherein said step of shaping comprises the step of amplifying and shaping said detected current signal.

4. The method of claim 1, wherein said inductance is operated in a substantially linear area of its characteristic.

5. A stable direct voltage source for use with a load comprising:
    an inductance connected in series with a controllable switching element, a resistance, and a resistive element that produces a voltage across its terminals generally independent of a current through said terminals;
    a current discriminator for detecting a current flowing through said inductance and for generating a detected current signal;
    means for shaping said detected signal and for producing a switching control signal;
    said controllable switching element receiving said switching control signal and, based upon said switching control signal, passing said direct current through said switching element and through said inductance when said direct current is less than a predetermined value and causing said direct current to loop through said inductance when said direct current is greater than said predetermined value;
    wherein the currenti in said inductance is regulated at a generally constant average value by means of said current discriminator and said controllable switching element, and wherein said current flows through said resistive element, whereby a stabilized voltage drop across said resistive element is produced for said load independently of a voltage drop across said resistance.

6. The direct voltage source of claim 5, wherein said resistance is resistive element formed by a Zener diode arrangement.

7. The direct voltage source of claim 6, wherein said controllable switching element is a switching transistor and said inductance is connected in parallel with a recovery diode.

8. The direct voltage source of claim 5, wherein said shaping means comprises a pulse shaper and amplifier.

9. The direct voltage source of claim 5, wherein said direct voltage source further comprises a full-wave rectifier bridge for power supply which is dimensioned for mains voltage.

10. The direct voltage source of claim 5, wherein a first power supply for said inductance is effected by a diode and is separate from a second power supply for said means for shaping.

11. The direct voltage source of claim 5, wherein said shaping means amplifies and shapes said detected current signal in order to produce said switching control signal.

12. An apparatus for supplying a stable direct voltage to a load comprising:
a first current path comprising a resistance, an inductor, a switching means, and a zener diode;
a current discriminator for detecting the current flowing through said first current path and for producing a detected current signal;
means, responsive to said current discriminator, for shaping said detected current signal and for turning on said switching means when said current is below a first value and for turning off said switching means when said current is above a second value; and
a recovery diode connected in parallel to said inductor and said zener diode for causing said current to loop back through a second circuit path comprised of said resistance, said inductor, said zener diode, and said recovery diode when said switching means is turned off;
whereby said load, which is connected in parallel to said zener diode, is provided with said stable direct voltage, which is independent of a voltage drop across said resistance.

13. An apparatus for supplying a stable direct voltage as set forth in claim 12, wherein said switching means comprises a transistor and said inductor is operated in a substantially linear area of its characteristic.

14. An apparatus for supplying a stable direct voltage as set forth in claim 13, wherein said current discriminator is connected to said first circuit path and said means for turning on or off said switching means turns on or off said transistor according to a voltage detected across a resistor, which is connected to said current discriminator.

15. A method for generating a stable direct voltage for use with a load comprising the steps of:
generating a direct current in an inductance;
regulating said direct current with a current discriminator to a generally constant level;
passing said direct current through a zener diode arrangement in series with a resistance, wherein the stable direct voltage for said load is determined by the current through said zener diode arrangement and is independent of the voltage across said resistance.

16. A method for generating a stable direct voltage comprising the steps of:
generating with a power supply a direct current through an inductance;
passing the regulated direct current across a resistance and a resistive element, wherein said stable direct voltage is generated across said resistive element;
detecting a magnitude of said direct current with a current discriminator and producing a detected current signal;
shaping said detected current signal and generating a switching control signal;
switching, in accordance with said switching control signal, said power supply on and off in order to maintain said magnitude within a range of values; and
looping said direct current back through said inductance, said resistance, said resistive element, and a recovery diode when said power supply is switched off;
wherein said resistive element exhibits characteristics such that said stable direct voltage generated is relatively independent of said magnitude of said stable direct current and independent of a voltage drop across said resistance.

17. A method for generating a stable direct voltage as set forth in claim 16, wherein said resistive element comprises at least two zener diodes and said inductances is operated in a substantially linear area of its characteristic.

18. A method for generating a stable direct voltage as set forth in claim 16, wherein said step of shaping comprises the steps of amplifying and shaping said detected current signal in order to produce said switching control signal.

19. A stable direct voltage source for use with a load comprising:
an inductance connected in series with a resistance, a controllable switching element and a zener diode that produces a voltage across its terminals generally independent of a current through said terminals; and
a current discriminator for detecting a current flowing through said inductance;
wherein the current in said inductance is regulated at a generally constant average value by means of said current discriminator and said controllable switching element, and wherein said current flows through said zener diode, whereby a stabilized voltage drop across said zener diode element is produced for said load independently of a voltage drop across said resistance.

20. The stable direct voltage source of claim 19, wherein said load, said resistance, and said inductance are arranged whereby when said load is shortcircuited, the current through said inductance is limited by said resistance.

21. The stable direct voltage source of claim 19, wherein said load and said resistance are arranged so that at least some of the current flowing through said resistance flows through said load.

* * * * *